United States Patent [19]

Copeland

[11] Patent Number: 4,523,629
[45] Date of Patent: Jun. 18, 1985

[54] METHOD AND APPARATUS FOR OPERATING AN IMPROVED THERMOCLINE STORAGE UNIT

[75] Inventor: Robert J. Copeland, Lakewood, Colo.

[73] Assignee: The United States of America as represented by the United States Department of Energy, Washington, D.C.

[21] Appl. No.: 429,740

[22] Filed: Sep. 30, 1982

[51] Int. Cl.³ ............................................. F28D 21/00
[52] U.S. Cl. ......................................... 165/1; 126/437; 165/104.19
[58] Field of Search ................ 165/104.19, 1; 126/437

[56] References Cited

U.S. PATENT DOCUMENTS

| | | | |
|---|---|---|---|
| 2,486,833 | 11/1949 | Freund | 126/437 |
| 4,248,049 | 2/1981 | Briley | 126/437 |
| 4,390,008 | 6/1983 | Andrews | 126/437 |

FOREIGN PATENT DOCUMENTS

| | | | |
|---|---|---|---|
| 2724416 | 12/1978 | Fed. Rep. of Germany | 126/437 |
| 2912785 | 10/1980 | Fed. Rep. of Germany | 126/437 |
| 12239 | 1/1982 | Japan | 126/437 |

Primary Examiner—Albert W. Davis, Jr.
Attorney, Agent, or Firm—Kenneth L. Richardson; Jeannette M. Walder; Judson R. Hightower

[57] ABSTRACT

A method and apparatus for operating a thermocline storage unit in which an insulated barrier member is provided substantially at the interface region between the hot and cold liquids in the storage tank. The barrier member physically and thermally separates the hot and cold liquids substantially preventing any diffusing or mixing between them and substantially preventing any heat transfer therebetween. The barrier member follows the rise and fall of the interface region between the liquids as the tank is charged and discharged. Two methods of maintaining it in the interface region are disclosed. With the structure and operation of the present invention and in particular the significant reduction in diffusing or mixing between the hot and cold liquids as well as the significant reduction in the thermal heat transfer between them, the performance of the storage tank is improved. More specifically, the stability of the interface region or thermocline is enhanced and the thickness of the thermocline is reduced producing a corresponding increase in the steepness of the temperature gradient across the thermocline and a more efficiently operating thermocline storage unit.

35 Claims, 8 Drawing Figures

METHOD AND APPARATUS FOR OPERATING AN IMPROVED THERMOCLINE STORAGE UNIT

CONTRACTUAL ORIGIN OF THE INVENTION

The United States Government has rights in this invention pursuant to Contract No. EG-77-C-01-4042 between the U.S. Department of Energy and the Midwest Research Institute.

BACKGROUND OF THE INVENTION

1. Field of the Invention

The present invention generally relates to the field of thermocline storage systems and more particularly to improvements in the structure and operation of a storage tank for such systems.

2. Description of the Prior Art

A common design for a simple thermocline storage system includes a single thermal storage tank, lines connecting it with a source of thermal heat (e.g., solar collectors), and a discharge heat exchanger. The lines typically form a closed system; and in operation, thermal energy (i.e., heat) is supplied from the solar or other sources to heat a liquid being circulated in the system. The liquid is the storage medium and once heated, it is stored in the top of the storage tank above a volume of the same liquid at a colder temperature.

Since the hotter liquid is less dense than the colder, the hotter and colder volumes of liquid stratify in the storage tank with the hotter above the colder. In doing so, a natural interface region or thermocline is formed between the two volumes of liquid. This natural interface region extends substantially horizontally and moves vertically relative to the tank during the operation of the system. For example, during the charge cycle, cold liquid is withdrawn from the bottom of the tank, heated in a heat exchange with the heat source (e.g., solar collectors), and returned to the top of the tank. During charge, the interface region moves down until it reaches the bottom of the tank at which time the tank is then fully charged. During discharge, hot liquid is withdrawn from the top of the tank, cooled in the discharge heat exchanger (transferring heat to the end use load), and returned to the bottom of the tank. During this time, the interface region moves up until it reaches the top of the tank at which time the device is then fully discharged.

Thermal storage designs similar to the simple thermocline described above include a membrane or bladder tank, mixed tank, and a two design. In the membrane or bladder tank, a flexible membrane is fixed about its perimeter to the interior of the tank roughly at the middle height of the tank. As the tank is charged, the membrane distends downwardly to form a downward-extending, concave shape, and conversely, the membrane distends upwardly into an upward-extending, concave shape during discharge. The membrane creates an artificial interface region during operation which does not extend horizontally but rather follows the shape of the membrane (i.e., concave downwardly during charge and concave upwardly during discharge). Membrane tanks permit no passage of liquid by the membrane and typically have an Ullage factor (representing the unusable percentage of the tank volume) on the order of 20%.

In a mixed tank design, the hot and cold liquids are continuously mixed during both charge and discharge. The whole tank is then at the same temperature at any point in time. As compared to a simple thermocline unit in a comparable system, the mixed tank design has several drawbacks. First, the mixed tank design produces a lower maximum temperature in the stored liquid available for end use. Second, because cold liquid enters and is mixed with the stored liquid in the tank during discharge, the temperature of the discharging liquid continuously drops wherein only low temperature heat is generally delivered for most of the discharge cycle. Third, during charging, the cool liquid leaving the tank is at a higher temperature than in a comparable thermocline design and, therefore, larger lines and pumping power as well as heat exchangers typically must be used in order to absorb the heat produced by identical solar collectors, particularly at peak periods. Due to the mixing and the changing output temperature levels in a mixed tank design, the average temperature from the heat source must be higher to match the performance of a thermocline unit. From a pure collection standpoint, for example, and in a like system using flat plate solar collectors, the net energy collected with a thermocline unit can be on the order of 20% greater than with a mixed tank design.

The two tank approach has basically the same performance advantages as the thermocline design; however, the fundamental drawback of the two tank approach is that it requires an additional tank. Further, with the two tank design, both tanks must be sized to hold the entire volume of the liquid for fully charged and fully discharged conditions. The quantity of storage liquid is approximately the same but with the thermocline design, the cost for tanks is cut in half. Further, the thermocline design has less heat loss due to the elimination of the second tank. The primary reduction in heat loss is due to the elimination of the surface area of the second tank. It also typically has a lower average operating temperature in that both systems are commonly held in the discharged state longer than they are held in the charged state. Consequently, with minimum and maximum temperatures of, for example, 100° F. and 150° F., the average operating temperature of the two tank approach is roughly 125° F. whereas the thermocline design is more on the order of 120° F. or less. For a total system over time, the smaller surface area and lower average operating temperature of the thermocline approach offer input power savings while offering substantially identical output performance.

SUMMARY OF THE INVENTION

The present invention involves improvements in the structure and operation of a storage tank in a thermocline storage system. In the improved design, the storage tank is provided with an insulated barrier member substantially at the interface region between the hot and cold liquids. The barrier member physically and thermally separates the hot and cold liquids substantially preventing any diffusing or mixing between them and substantially preventing any heat transfer therebetween. The barrier member follows the rise and fall of the interface region between the liquids as the tank is charged and discharged and two methods of maintaining it in the interface region are disclosed. In one, the movement of the interface region is sensed, for example, by thermocouples and the barrier member is mechanically moved in response thereto. In the other, the density of the barrier member is made to be between the densities of the hot and cold liquids wherein it floats substantially at the interface region. The barrier member preferably has a constant density and sufficient structural strength to maintain a constant density and volume under the full static head of the liquid as occurs at full charge and under no static head as occurs at full discharge. With the structure and operation of the present invention and in particular the significant reduction in diffusing or mixing between the hot and cold liquids as well as the significant reduction in thermal heat transfer between them, the performance of the storage tank is improved. More specifically, with the barrier member of the present invention, the stability of the interface region or thermocline is enhanced and with the insulated barrier member of the preferred embodiment, the thickness of the thermocline is reduced. These results produce a corresponding increase in the steepness of the temperature gradient across the thermocline and more efficient operation of the thermocline storage unit.

BRIEF DESCRIPTION OF THE DRAWINGS

The novel features which are believed to be characteristic of the present invention are set forth in the appended claims. The invention itself, however, together with further objects and attendant advantages thereof, will become apparent and best understood by reference to the following detailed description taken in connection with the accompanying drawings, setting forth by way of illustration and example certain embodiments of the invention in several figures of which like reference numerals identify like elements, and in which:

FIG. 3 is a top view taken along line 3—3 of FIG. 1 illustrating the general shape of the raft or barrier member and its size and positioning relative to the storage tank. FIG. 3 also illustrates the internal structure of the raft or barrier member and its exterior spacing nodules which aid in keeping the raft centered in the tank as it rises and falls with the interface region.

FIGS. 5a and 5b illustrate temperature profiles in the storage tank comparing the ideal profile with that of the storage tank with and without the raft or barrier member of the present invention. In FIG. 5a, the temperature profile is shown during charging after there has been a full discharge and in FIG. 5b, it is shown after the hot and cold liquids have been stored in the tank for some time.

DETAILED DESCRIPTION OF THE PREFERRED EMBODIMENTS

Figure 1:
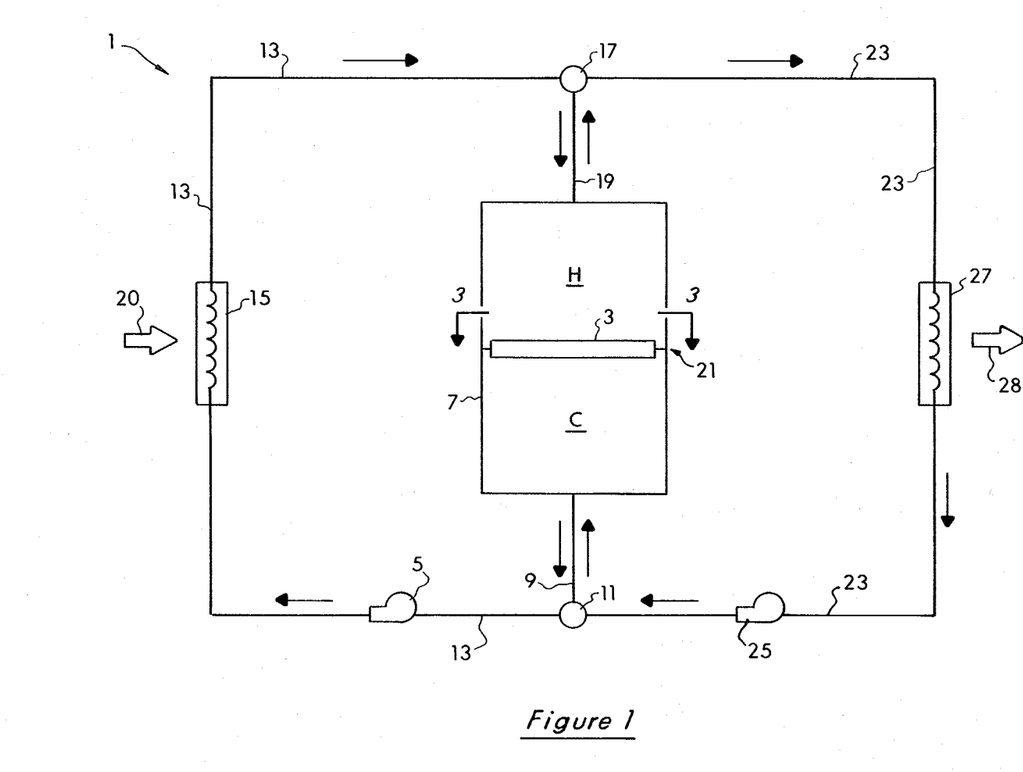
FIG. 1 is a schematic illustration of a simple thermocline storage system employing one embodiment of the present invention. In this embodiment, a thermally insulated raft or barrier member is provided in the storage tank and the density of the barrier member is adjusted so that it floats substantially at the interface region between the hot and cold liquids.

FIG. 1 schematically illustrates a simple thermocline storage system 1 employing the raft or barrier member 3 of the preferred embodiment. In a charging mode of system 1, fluid (e.g., liquid water) is first drawn under the force of pump 5 from the bottom of the storage tank 7 through line 9 and valve 11 into line 13. It then passes on through line 13 where it is heated at 15 and directed through valve 17 and line 19 into the top of the storage tank 7. The liquid is heated at heat exchanger 15 with thermal heat 20 supplied from any desired source (e.g., solar collectors). As the hotter, less dense liquid H enters the top of the tank 7, it stratifies with the colder, denser liquid C and forms a natural interface region or thermocline 21 therebetween. This natural, interface region 21 extends substantially horizontally, and in the preferred embodiment, an insulated raft or barrier member 3 is provided which has a density greater than that of the hot liquid and less than that of the cold liquid wherein the raft or barrier member 3 float substantially at the interface region 21. Further, this floating characteristic of the barrier member 3 automatically serves to maintain it at the interface region 21 as the interface region 21 moves vertically relative to the tank 7 as will be explained in more detail below.

Still referring to FIG. 1, once the tank 7 is charged (e.g., half charged as shown in FIG. 1 or fully charged with the barrier member 3 at the bottom of the tank 7), system 1 can be easily switched (manually or preferably by a control means) to a discharge mode by turning valves 11 and 17 to place lines 9 and 19 in fluid communication with line 23. In this configuration, hot liquid under the force of pump 25 passes out of the tank 7 into line 19 and through the valve 17 into line 23. The hot liquid then passes through the discharge heat exchanger 27 where the stored heat in the hot liquid is transferred at 28 out of the system 1. The cold liquid leaving the discharge heat exchanger 27 then continues on through line 23, valve 11, and line 9 into the bottom of the tank 7.

Figure 2:
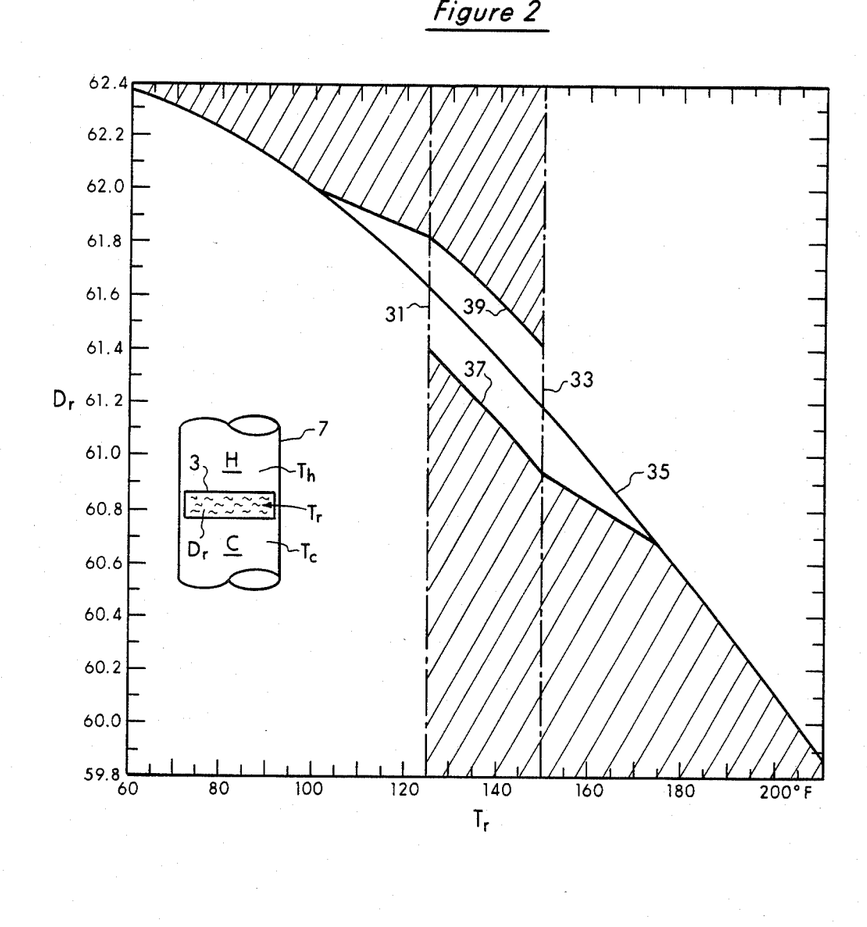
FIG. 2 is a graph of the preferred ranges of density for the raft or barrier member of FIG. 1 in typical storage applications using hot and cold water with a temperature differential of 50° F., a cold water range of 100° F. to 125° F., and a hot water range of 150° F. to 175° F.

In the preferred embodiment, the barrier member 3 floats at the interface region 21 due to its density and this characteristic automatically maintains the barrier member substantially at the interface region 21 as the interface region 21 rises in the tank 7 during discharge and falls during charging. As illustrated in FIG. 2, the density $D_r$ of the barrier member 3 must be carefully selected so that it will float in the interface region 21. In FIG. 2, for example, common operating conditions for a water system are plotted. In this example, the temperature differential $(T_h - T_c)$ between the hot and cold water H and C is roughly 50° F., the temperature range for the cold water is 100° F. to 125° F., and the range for the hot water is 150° F. to 175° F. The average temperature of the interface region 21 and the ideal average temperature of the raft member 3 is then in the range of 125° F.–150° F. (i.e., $T_r = \frac{1}{2}(T_h + T_c)$°F.) as shown by lines 31 and 33. The density of water in this range is plotted at 35 wherein the desired density range of the raft member 3 in pounds per cubic foot under these conditions is then bounded by the lines 31, 33, 37, and 39 in this example. The cross hatching in FIG. 2 below and above lines 37 and 39 between the lines 31 and 33 represents undesirable densities for the raft. If the raft temperature versus density characteristics enter the hatched area, the raft or barrier member 3 can leave the interface region 21 (i.e., sink to the bottom of tank 7 or rise to the top of tank 7) regardless of the state of the charge (i.e., location of the interface region 21).

Figure 3:
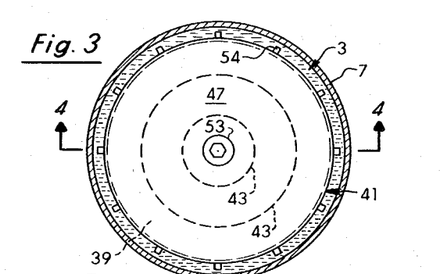
Figure 4:
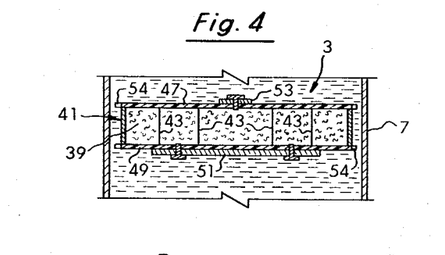
FIG. 4 is a cross-sectional view of the raft or barrier member taken along line 4—4 of FIG. 3 illustrating the relationship of the thermal insulation and structural strength members as well as the manner in which the thermal insulation is encapsulated to make it fluid tight in the preferred embodiments.

FIGS. 3 and 4 illustrate a design of a raft member 3 to meet the operating conditions of FIG. 2. This design employs a urethane foam 39 encapsulated in the fluid-tight plastic shell 41. The foam 39 in this example has a conductivity of 0.015 BTU/HR-FT-°F. versus 0.37 BTU/HR-FT-°F. for water. With such an insulation, the heat transfer across the interface region 21 can be reduced by a factor of about 20. Other thermal convection and conduction insulations such as fiberglass are also contemplated as is the addition of thermally opaque materials such as metal foils to the raft member 3 to reduce thermal radiation between the hot and cold liquids. The shell 41 is to prevent water absorption by the foam 39 and to provide structural rigidity to maintain the predetermined configuration of the raft member 3. If desired, additional structural strength can be provided by honeycomb or annular strength members such as 43 in FIGS. 3 and 4 extending between the upper layer of polycarbonate 47 and lower layer of plexiglass 49 of the shell 41. In the preferred embodiment, the density of the raft member 3 is constant as is its volume regardless of whether it is under the full static head of the water at full charge or no static head as occurs at full discharge. Weight adjustments to obtain the desired density can be made, for example, by adding stainless steel weights interiorly or exteriorly to the shell 41. In the illustration of FIG. 4, gross weight adjustments have been made by adding gross weight steel plate 51 to the bottom of the shell 41 and final adjustments by adding trim weight 53 to the top of the shell 41. In the above example and based largely on the conductance of the raft member 3 and water and their density-temperature characteristics in the operating ranges of this example, the height of the raft member 3 is preferably about 5% of the height of tank 7 with the vertical thermal resistivity of the raft member 3 substantially equal to that of the column of water in the tank 7.

The raft member 3 preferably has protuberances or nodules 54 spaced about the upper and lower layers 47 and 49 of the shell 41. The nodules 54 help to maintain the substantially cylindrical raft member 3 in FIGS. 3 and 4 centered in the substantially cylindrical tank 7 as it rises and falls with the interface region 21. The nodules 54 also permit a relatively small volume of liquid from the hot and cold volumes to freely flow past the raft member 3 about its perimeter. This is often desirable during long storage periods as heat escaping through the upper portion of the tank 7 from the hot liquid H will produce cooler, denser liquid adjacent the inner walls of the tank 7. With the nodules 54 ensuring some spacing between the raft member 3 and the tank's walls, this cooler liquid can then pass by the raft member to the lower region of colder liquid C. Although this slightly reduces the volume of the stored, hot liquid H, it more importantly does not significantly reduce the maximum temperature of the hot liquid and therefore does not adversely affect the performance of the storage tank 7. Further, because fluid can pass by the raft member 3, virtually the entire volume of the tank 7 can be used producing an Ullage factor of nearly zero. Although spacing is preferred, the raft member 3 could sealingly engage the tank walls if desired.

Figure 5A:
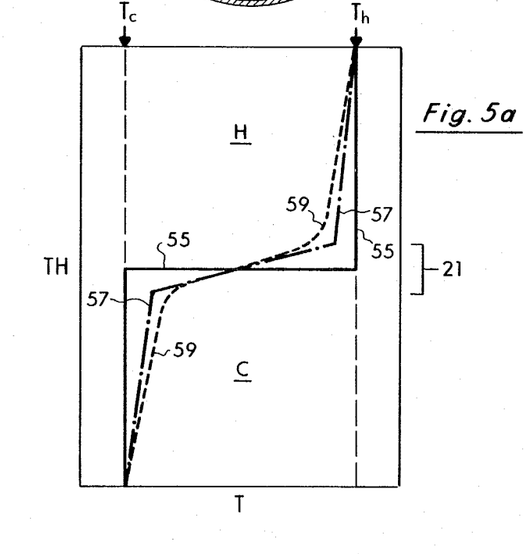
Figure 5B:
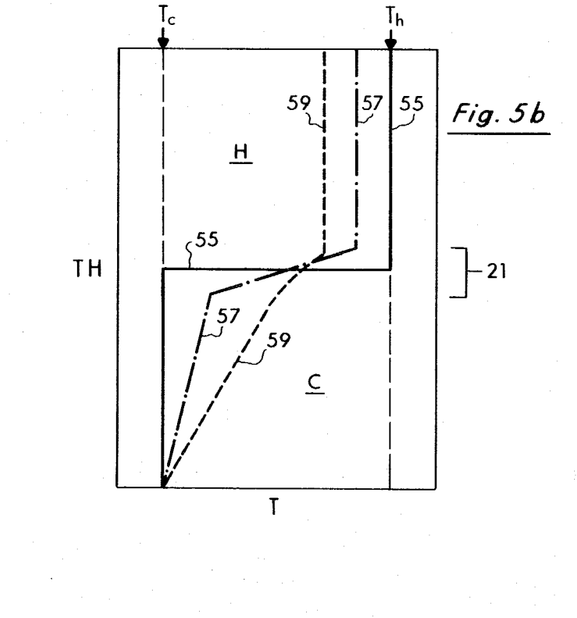

The advantages of the raft or barrier member 3 are illustrated in FIGS. 5a and 5b. In FIGS. 5a and 5b, three thermocline profiles (ideal at 55, with a raft member at 57, and with water only at 59) are shown under two different conditions. In these FIGS. 5a and 5b, temperature (T) is plotted against the height of the tank (TH). In FIG. 5a, the profiles are illustrated as they exist during charging after there has been a full discharge. In FIG. 5b, they are shown as they exist after the hot and cold liquids have been stored in the tank 7 for some time. In each case, the ideal profile 55 is a step function with an infinitely steep temperature gradient (vertical as viewed from the left in FIGS. 5a and 5b) at the interface. During charging after a full discharge as shown in FIG. 5a, the minimum and maximum temperatures ($T_c$ and $T_h$) are roughly identical at the bottom and top of the tank 7 for all three profiles. However, the temperature gradient in the interface region 21 with the raft member 3 present is steeper than with water only. Further, for comparable temperature ranges, the interface region is also smaller. The improved results over water only of FIG. 5a are due in larger part to the physical barrier provided by the raft member 3 than to its insulating properties (R value). In FIG. 5b which shows the profiles after the hot and cold liquid have been stored for a while in the tank 7, the advantages of insulating the raft member 3 are best illustrated. As in FIG. 5a, the minimum temperature ($T_c$) at the bottom of the tank 7 in all the profiles of FIG. 5b is roughly identical. However, the isothermal temperature of the hot liquid H above the interface region 21 using an insulated raft member 3 is significantly higher than with water only and the temperature gradient in the interface region 21 is also steeper. Further, as best illustrated in FIG. 5b, significantly lower temperatures are maintained over the height of the cold liquid C from the bottom of the tank 7 to the interface region 21 wherein during charging, the source of thermal energy inputting to the heat exchanger 15 in FIG. 1 can be more efficiently and effectively utilized.

Referring again to FIG. 5b, the profile 57 with the raft member 3 present and the water only profile 59 differ from the ideal step profile 55 primarily due to the effects of conduction of heat by the water and heat losses from the side of the tank 7. With water only, the hot water above the interface region 21 tends to be isothermal. This effect is due to natural convection currents set up by heat losses from the side of the tank 7. Below the interface region 21, conduction and natural convection reinforce each other and a near linear temperature profile develops. Due to heat conduction across the interface region 21 and the side heat losses from the tank 7, the temperature of the hot water above the interface region 21 is significantly below the ideal case. With an insulating raft member 3 present at the interface region 21, conduction across the interface region 21 is greatly reduced. While the same effects are present with as the raft member 3 as the pure water case, the magnitudes are reduced. Consequently, the hot water temperature above the interface region 21 is higher than with water only and the temperatures beneath the interface region 21 are lower than in the water only case.

Figure 6:
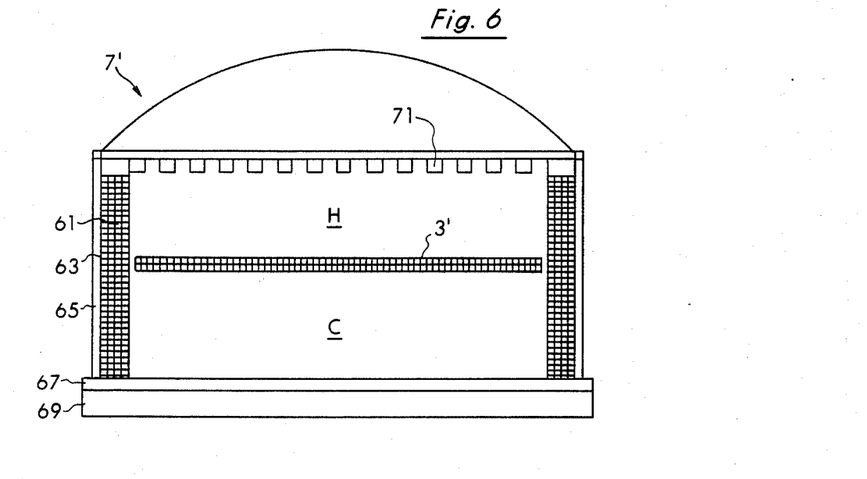
FIG. 6 is a schematic illustration of the present invention adapted for use with molten salt as the storage medium.

FIG. 6 illustrates a storage tank 7' according to the present invention adapted for use with molten salt as the liquid storage medium. Such a unit is particularly suited for solar thermal electric power cycles (e.g., Brayton or combined cycles), high temperature process heat, and fuels and chemical production in which heat delivery temperatures on the order of 1100° C. (2000° F.) are required. In these applications, the maximum temperature delivered from storage is important; and, the process and cycle in many cases cannot operate if the temperature of the heat supplied is too low as would occur with a comparable mixed tank design. In FIG. 6, the tank 7' is internally insulated at 61 wherein the insulation is submerged in the molten salt and wetted by it. The internal insulation 61 is employed to allow the use of low cost carbon steel in the containment wall 63. Low cost insulation 65 is then placed outside the containment wall 63 to reduce heat losses. The floor of the tank 7' is castable insulation which is set atop a layer of structural concrete 69. Lower cost and more effective dry insulation (non-wetted) is sealed in the stainless steel liner 71 at the top of the tank 7'. The dry insulation is not load bearing and is above the liquid level. The dry insulation is not employed on the inner sides of the tank 7' because of the high liquid static pressure heat. Since materials which could be employed to carry the static load of 2000° F. are very expensive, the wetted insulation is more cost effective when there is liquid present.

The raft member 3' in FIG. 6 serves the same functions as in the water theromcline case (physically and thermally separating the hot and cold liquid thereby preventing the diffusing or mixing of the liquids as well as the thermal transfer of heat therebetween). With molten salts, there is about a 20% density difference for the conditions of FIG. 6. Thus, the design of the raft member 3' to meet the density requirements discussed above allows tolerances to be larger. The use of the raft member 3' in the molten salt is more important than with water because the large temperature difference ($T_h$ about 2000° F. and $T_c$ about 660° F.) and high conductance of the molten salt produce a large heat transfer rate (about 20 times that of water in a typical water thermocline) resulting in a very thick interface region. Since the molten salt (e.g., chlorides, carbonates, and hydroxides of sodium, potassium, lithium, and magnesium) is fairly transparent to thermal radiation, the raft member 3' preferably includes material such as metallic foil that reflects thermal radiation making the raft member 3' substantially opaque to the thermal radiation generated by the hot and cold molten salt. Further, the effectiveness of the insulation of the raft member 3' preferably reduces the size of the interface region to be on the order of 5% of the height of the tank. As in the water examples of the previous embodiments and based largely on the conductance properties of the raft member 3' and the water, the height of the tank, the density-temperature characteristics of the fluid, and the temperature ranges, the height of the raft member 3' is also preferably about 5% of the height of the tank 7'. In this manner, the thermal resistivity across the raft member 3' is approximately equal to the thermal resistivity of the column of molten salt within the tank 7'.

Figure 7:
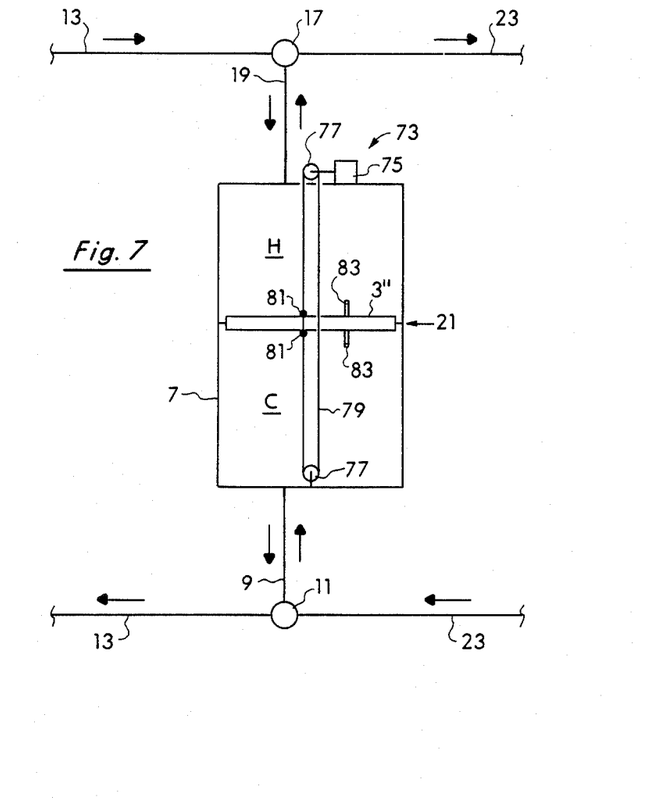
FIG. 7 is a schematic illustration of the present invention according to another embodiment in which the movement of the interface region is sensed and the barrier member is mechanically moved in response thereto in order to maintain it in the interface region between the hot and cold liquids.

In FIG. 7, another embodiment of the present invention is shown in which the barrier member 3" is mechanically moved by the pulley system 73 composed of the motor drive 75, pulleys 77, and wire 79 affixed at 81 to the raft member 3". In this embodiment, the raft member 3" is shown as being spaced from the walls of the tank 7; however, the raft member 3" could sealingly engage the inner walls of the tank 7 if desired. In operation, movement of the interface region 21 is sensed by the thermocouples 83 and the barrier member 3" is then mechanically moved by the motorized pulley system 73 in response thereto in order to maintain the raft member 3" substantially at the interface region 21 as the interface region 21 moves vertically relative to the tank 7. If desired, the movement of the interface region 21 could also be sensed, for example, by thermistors, static pressure sensors, or other similar devices. As with all of the embodiments using a barrier member, the performance of the storage unit is improved by significantly reducing the diffusing or mixing between the hot and cold fluid as well as significantly reducing the thermal heat transfer between them. This results in a thinner interface region or thermocline and a hydrodynamically more stable thermocline having a steeper temperature gradient across it.

Other anticipated applications of the present invention include thermocline storage units using organic fluid such as oil as well as units employing two different fluids. In most applications, the hot liquid will have a higher temperature than the colder liquid (e.g., the temperature differential in a typical hot water system is on the order of 50° F.–100° F. and in a molten salt system on the order of 600° F.–1300° F.); however, in applications such as solar ponds in which the hotter salt water is denser than the colder fresh water, the liquids stratify with the hotter liquid below the colder one. It is also anticipated that the present invention can be used in chilled water storage (e.g., for building cooling applications) wherein the water is chilled, for example, directly in an evaporator of an absorption chiller using sulfuric acid heated by solar collectors. In a contemplated system, the chilled water is stored at 2° C. and the hotter water at 15° C. Due to the lower temperature of the chilled water compared to a conventional chilled water thermocline with a minimum temperature of about 7° C. and the reduced thermal gradient thickness due to the insulated barrier member, a 15%–50% reduction in the chilled water tank volume is possible. Since the cost of the tank is one of the largest items in a chilled water system, these gains are significant. In this application and because the barrier member must operate in the density inversion region of water (i.e., 4° C.), the active control of FIG. 7 would be preferred. The preferred embodiments of the invention are particularly suited to electric power and process heat applications which require high temperature energy from storage. In these applications, the load can be met almost entirely from the stored fluid as the high temperature energy which is available from the thermocline storage unit at all stages of charge (i.e., nearly full to nearly empty) is substantially constant.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein but may be modified within the scope of the appended claims.

The embodiments of the invention in which an exclusive property or privilege is claimed are defined as follows:

1. An improved method for operating a thermocline storage unit, said method comprising the steps of:
   (a) providing a tank containing a first fluid at a first density and a second fluid at a second density, said first density being less than said second density wherein said fluids stratify within said tank with said first fluid above the second fluid and forming a natural interface region therebetween extending substantially horizontally, (b) maintaining said first fluid at a first temperature and maintaining said second fluid at a second temperature, said first temperature being higher than said second temperature, (c) using a barrier member to substantially separate said first and second fluids from each other substantially at said horizontally extending interface region, (d) selectively increasing and decreasing the respective volumes of the first and second fluids in said tank wherein said horizontally extending interface region therebetween moves substantially vertically relative to said tank, (e) maintaining a difference in temperature between said first fluid of said first tank and said second fluid of said second tank, and maintaining such separation of said step (c) as said horizontally extending interface region moves vertically relative to said tank, and (f) adapting said barrier member to float between said first and second fluids substantially at said interface region as said interface region moves relative to said tank to maintain such separation of step (c) and providing said barrier member with a plurality of nodules, said nodules being situate at said barrier member such that said barrier member is enabled to remain substantially centered relative to said tank while permitting relatively small portions of said fluids to freely pass by said barrier member.

2. The method of claim 1 wherein step (c) includes the further limitation of substantially thermally insulating said first and second fluids from each other substantially at said interface region and step (e) includes the further limitation of maintaining said thermal insulation between said first and second fluids as said interface region moves relative to said tank.

3. The method of claim 1 wherein step (e) includes the further limitations of maintaining said separation of step (c) by sensing the vertical movement of the interface region and mechanically moving said barrier member in response thereto to maintain said barrier member substantially at said interface region as said interface region moves relative to said tank.

4. The method of claim 3 further including the limitation of providing said barrier member with thermal insulation wherein said barrier member substantially thermally insulates said first and second fluids from each other.

5. The method of claim 1 further including the limitation of making the density of said barrier member to be greater than the density of the first fluid and less than the density of the second fluid.

6. The method of claim 5 further including the limitation of providing said barrier member with thermal insulation wherein said barrier member substantially thermally insulates said first and second fluids from each other.

7. The method of claim 5 further including the limitation of maintaining the density of the barrier member constant as said barrier member moves with said interface region relative to said tank.

8. The method of claim 1 further including the limitation of forming said barrier member by encapsulating thermal insulation within a fluid tight material.

9. The method of claim 1 further including the step of permitting a relatively small portion of said first and second fluids to freely flow past said barrier member.

10. The method of claim 1 further including the limitation of making said barrier member opaque to thermal radiation generated by said first and second fluids.

11. The method of claim 1 wherein said barrier member has a first height and said tank has a second height and said method includes the further limitation of making said first height to be about 5% of said second height.

12. The method of claim 1 further including the step of substantially equating the vertical thermal resistivity of the barrier member with the vertical thermal resistivity of the fluids in said tank.

13. The method of claim 1 wherein step (c) includes the further limitation of using a barrier member with a predetermined, rigid configuration to substantially separate said first and second fluids from each other at said interface region.

14. The method of claim 1 including the further limitation of using a common medium for said first and second fluids.

15. The method of claim 14 wherein said common medium is primarily water.

16. The method of 14 wherein said common medium is primarily molten salt.

17. The method of claim 14 wherein said common medium is primarily oil.

18. In a thermocline storage unit having a tank containing a first fluid at a first density and a second fluid at a second density, said first density being less than said second density wherein said fluids stratify within said tank with said first fluid above the second fluid and forming a natural interface region therebetween extending substantially horizontally, said unit further including means for selectively increasing and decreasing the respective volumes of the first and second fluids wherein said interface region therebetween moves substantially vertically relative to said tank, the improvement including:

(a) means for substantially separating said first and second fluids from each other substantially at said horizontally extending interface region, and (b) means for maintaining said separating means substantially at said horizontally extending interface region as said interface region moves vertically relative to said tank, wherein said separating means includes a barrier member extending substantially between said first and second fluids at said interface region, said barrier member including a number of protruding members extending outwardly of said barrier member and spaced thereabout to maintain said barrier member substantially centered relative to said tank while permitting relatively small portion of fluids to freely pass by said barrier member.

19. The improvement of claim 18 wherein said separating means includes means for substantially thermally insulating said first and second fluids from each other substantially at said interface region as said interface region moves relative to said tank.

20. The improvement of claim 18 wherein said maintaining means includes means for sensing the vertical movement of the interface region and means for mechanically moving said barrier member in response thereto to maintain said barrier member substantially at said interface region as said interface region moves relative to said tank.

21. The improvement of claim 20 wherein said barrier member further includes means for substantially thermally insulating said first and second fluids from each other.

22. The improvement of claim 18 wherein said barrier member has a density greater than the density of said first fluid and less than the density of the second fluid wherein said barrier member floats between said first and second fluids substantially at said interface region as said interface region moves relative to said tank.

23. The improvement of claim 22 wherein said barrier member includes means for substantially thermally insulating said first and second fluids from each other.

24. The improvement of claim 22 further including means for maintaining the density of the barrier member constant as said barrier member moves with said interface region relative to said tank.

25. The improvement of claim 18 further including means for encapsulating said thermal insulation within a fluid tight material.

26. The improvement of claim 18 wherein said tank has an inner wall with a first cross-sectional shape and area and said barrier member has a second cross-sectional shape and area substantially corresponding thereto with said first area being greater than said second area whereby a relatively small portion of said first and second fluids can freely flow past said barrier member.

27. The improvement of claim 18 wherein said barrier member further includes means for reflecting thermal radiation wherein said barrier member is opaque to thermal radiation generated by said first and second fluids.

28. The improvement of claim 18 wherein said barrier member has a first height and said tank has a second height with said first height being about 5% of said second height.

29. The improvement of claim 18 wherein the fluids in said tank have a first thermal resistivity in a vertical direction and said barrier member has a second thermal resistivity in a vertical direction wherein said first and second thermal resistivities are substantially equal.

30. The improvement of claim 18, wherein said barrier member has a predetermined, rigid configuration.

31. The improvement of claim 18 wherein said first and second fluids are a common medium.

32. The improvement of claim 31 wherein said common medium is primarily water.

33. The improvement of claim 31 wherein said common medium is primarily molten salt.

34. The improvement of claim 31 wherein said common medium is primarily oil.

35. In a thermocline storage unit having a tank containing a first fluid at first density and a second fluid at a second density, said first density being less than said second density wherein said fluids stratify within said tank with said first fluid above the second fluid and forming a natural interface region therebetween extending substantially horizontally, said unit further including means for selectively increasing and decreasing the respective volume the respective volumes of the first and second fluids wherein said interface region therebetween moves substantially vertically relative to said tank, the improvement including:
(a) means for substantially separating said first and second fluids form each other substantially at said horizontally extending interface region, and
(b) means for maintaining said separating means substantially at said horizontally extending interface region as said interface region moves vertically relative to said tank, and wherein said separating means includes a barrier member extending substantially between said first and second fluids at said interface region, and wherein said tank has an inner wall with a first cross-sectional shape and area, and said barrier member has a second cross-sectional shape and area substantially corresponding thereto with said first area being greater than said second area whereby a relatively small portion of said first and second fluids can freely flow past said barrier member, and wherein said barrier member further includes a number of protruding members extending outwardly of said barrier member and spaced thereabout to maintain said barrier member substantially centered relative to said tank while permitting said relatively small portion of fluids to freely pass by said barrier member.

* * * * *